(No Model.)
D. C. RIPLEY.
MACHINE FOR BLOWING GLASSWARE.
No. 458,190. Patented Aug. 25, 1891.
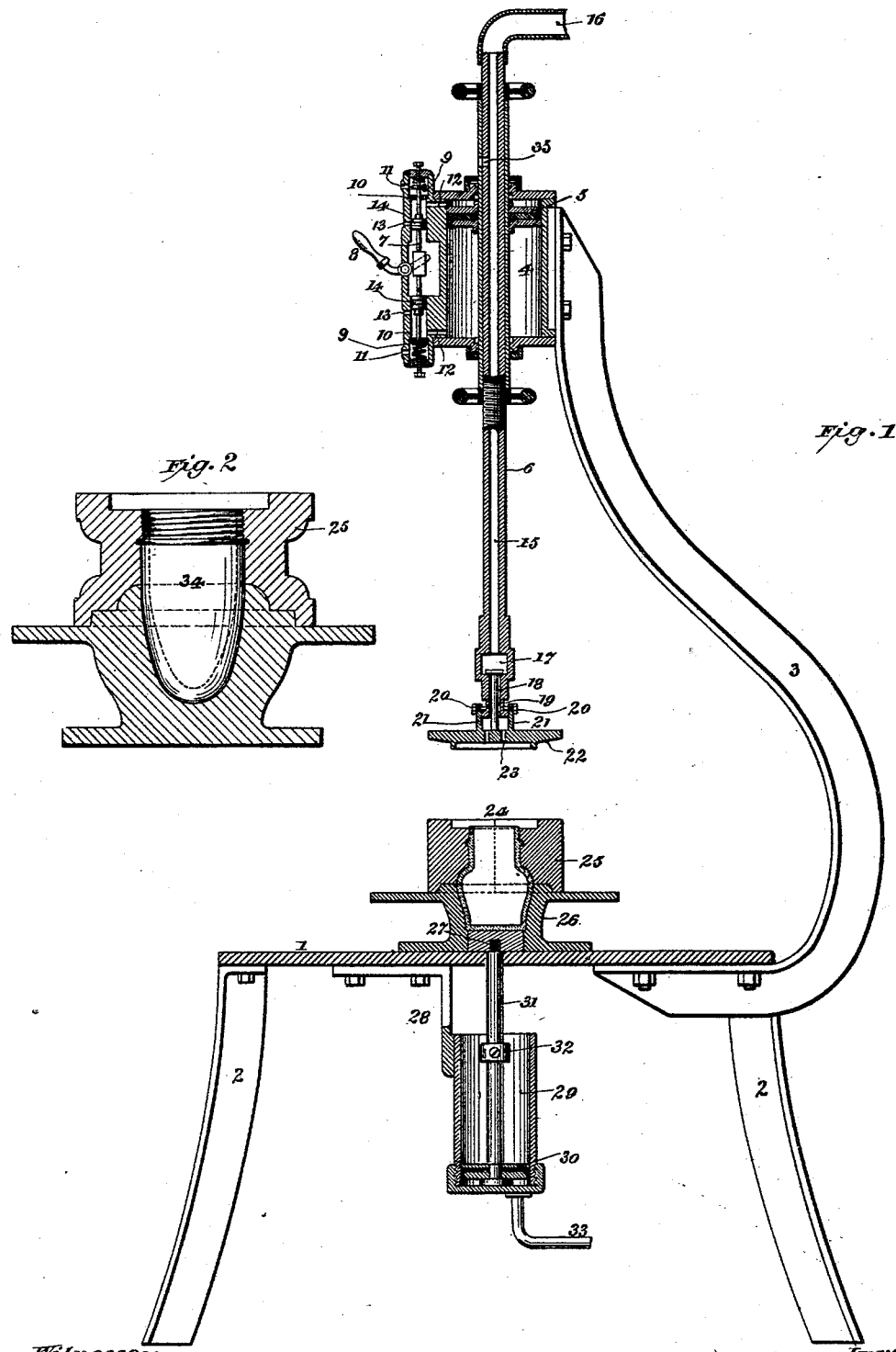
Witnesses:
Raphael Netter
M. L. Dyer
Inventor
Daniel C. Ripley
by Kerr & Curtis
Attorneys

UNITED STATES PATENT OFFICE.

DANIEL C. RIPLEY, OF PITTSBURG, PENNSYLVANIA.

MACHINE FOR BLOWING GLASSWARE.

SPECIFICATION forming part of Letters Patent No. 458,190, dated August 25, 1891.

Application filed January 13, 1891. Serial No. 377,609. (No model.)

*To all whom it may concern:*

Be it known that I, DANIEL C. RIPLEY, a citizen of the United States, residing at Pittsburg, in the county of Allegheny and State of Pennsylvania, have invented a new and useful Improvement in Machines for Blowing Glassware, of which the following is a specification.

My invention relates to the construction of machines for blowing glassware, and it is used in the manufacture of glass articles which are made from a previously-pressed glass-blank. The machine is operated by compressed air, the blow-pipe being connected to a suitable air-compressor pump or reservoir.

The invention also relates to devices for discharging the completed articles from the mold.

The object of my invention is combining the advantages of pressing and blowing in the manufacture of the same article. The advantage of pressing is that a better and sharper finish and greater uniformity of product can be obtained. For instance, the article shown in the drawing is a salt-dredge, which is designed to be fitted with a metallic screw-top; and as such tops are made of a uniform size and thread a similar uniformity of size and shape is required in the top of the glass bottle. This can be obtained with cheapness and certainty only by pressing in a suitable mold. The body of the dredge, however, is of greater diameter than the mouth, and such an article cannot be made by pressing because a plunger of that size cannot be inserted through the top. I therefore produce such an article by expanding the lower part or body in a blow-mold of the desired shape. In carrying out the operation I first form the blank in a press-mold composed of upper and lower sections, the upper section giving the required final shape to the upper end, and then lift such upper section with the hot article in it and place it on the blow-mold of my machine and expand the body of the article by blowing to the shape of the same. Thus I obtain the advantages of both methods of manufacture in the production of one article and am able to produce with great rapidity, cheapness, and mechanical precision superior articles of many shapes which have heretofore been possible to make only by slow and expensive operations.

To enable those skilled in the art to make and use my invention, I will now describe it by reference to the accompanying drawings, in which—

Figure 1 is a vertical section of my improved machine, and Fig. 2 is a sectional view of a mold for making the blank, the blank being shown in the mold.

To a mold-table 1, having suitable legs 2, I bolt a standard 3, preferably made of flanged iron or steel, and on the upper end of the standard I support a pneumatic cylinder 4, having a piston 5, mounted on a spindle 6, which works through suitable stuffing-boxes in the ends of the cylinder. At the side of the cylinder is a valve box or case, in which I place a vertically-sliding rod 7, which is operated by a bent lever 8. At each end of this rod, moving in a suitable chamber, is a valve 9, which operates in connection with a perforated seat 10 and controls an inlet-passage 11, by which air is admitted to the port 12, leading to the end of the cylinder 4. Each end of the cylinder is provided with an exhaust-port 13, controlled by a piston or slide-valve 14, mounted on the rod 7. This valve mechanism forms the subject-matter of another application of even date herewith.

In the drawings the piston 5 is shown at the upper end of the cylinder 4, and the upper valve 9 is opened to admit air through the passage 11, valve-seat 10, and passage 12 to the upper side of the piston. The upper exhaust-passage 13 is closed. The lower valve 9 is closed, and the lower exhaust-passage 13 is opened. The pressure of the air through 11 and 12 will cause the piston 5 to descend in the cylinder 4, and the air which is below the piston will escape through the lower passages 12 and 13.

The spindle 6 is hollow, as at 15, and is provided at the lower end with a disk or plate 22 for closing the mouth of the glass-mold. This disk has a tubular projection 21 on its upper side and is suspended on the end of the spindle by means of screws or bolts 20, which extend through the sides of the projection 21 into and are capable of a vertical movement in a recess or recesses 19 in the sides of the spindle. In a valve-chamber 17 in the lower end of the spindle is a valve 18, having a stem which projects beyond the lower end of the spindle. When the valve 18 rests on its seat in the chamber 17, the end of the stem does not come in contact with the plate. The plate 22 is also provided with openings 23, which extend from the interior of the tubular projection 21 downward. The passage 15 extends entirely through the spindle 6, and at the top or other suitable point it is connected with a flexible pipe 16, leading from a suitable air pump or reservoir, the admission of air being controlled by a suitable cock or valve placed in any convenient position.

The glass-blank 34 is pressed in the ordinary way in a mold, such as shown in Fig. 2, having a removable upper section 25, of proper shape, to form the upper portion of the same, leaving the lower portion thick and unfinished, so that if placed in a blow-mold it can be blown out to any desired shape. The upper section 25 of the press-mold with the blank 34 in it is then placed on the blow-mold section 26, the two sections then constituting a single mold 24. The bottom of the mold is preferably a removable plug or disk 27. The mold 24 being on the table 1, directly under the spindle 6, the lever 8 is moved so as to admit air to the cylinder 4 above the piston 5. This causes the spindle 6 to be forced downward, so as to bring the plate 22 into or upon the mouth of the mold, and as soon as it comes to its seat therein and closes the mold a further descent of the spindle causes its end to slide within the tubular projection 21 and the lower end of the valve-stem to come in contact with the plate 22 and raise the valve 18 from its seat, thereby permitting the air from the passage 15 to pass through the openings 23 into the interior of the heated glass-blank in the mold 24, the holes 23 being directly over the central opening of the glass-blank. The pressure of the air expands the soft glass article until it comes in contact with all the sides of the mold and the shape of the latter is imparted to it. The lever 8 is then moved in the opposite direction and the spindle raised, thereby permitting the valve 18 to come to its seat and raising the plate 22 out of the mold. The mold is then opened and the article removed and the operation repeated as described.

The spindle 6 not only closes the top of the mold and delivers the air into it, but it clamps the sections of the mold firmly together. If it did not perform this function, other means would have to be adopted for doing it, because the pressure of air admitted to the interior of the mold is great enough to raise the top section more or less off of the lower section, and this is destructive of the article which is being formed, because the glass will blow or force a pin out in the joint thus opened between the two sections. I overcome this objection by putting a greater pressure on the spindle than that admitted to the mold. It is evident that this function of the spindle is of great practical importance, as its mere coming to blowing position on or with reference to the mold clamps its sections firmly together and thereby obviates the necessity for special clamping devices and the loss of time incident to their use. Time is a material element in such a manufacture where the original heat of the article is depended on for the second step of the operation, as well as in the matter of wages. When the air which operates the piston 5 has the same pressure as that supplied to the mold, a preponderance of pressure on the spindle is insured by making the superficial area of the piston greater than that of the opposing or reacting surfaces in the mold. If desired, the cylinder 4 may be used simply for the purpose of closing and clamping the mold, in which case the valve 18 and its operating devices would be dispensed with and the admission of air to the mold be governed by any suitable kind of a cock or valve substituted therefor and placed either at the lower end of the spindle or in the line of the pipe 16.

The article may be removed from the mold by means of the following devices: A cylinder 29 is supported on the under side of the table 1 by a bracket 28 or other suitable means, and it is provided with a piston 30 and piston-rod 31. The rod 31 passes through a hole in the table 1 and is connected to the mold-bottom 27 by a suitable stem, either plain or threaded, as may be desired. It is also provided with a stop 32, adjustable to any height thereon, which, by coming in contact with the table 1, shall limit the upward movement of the piston 30. A pipe 33, connected with the compressed-air reservoir, supplies the compressed air to the cylinder 29 below the piston 30. This pipe 33 may be fitted with a suitable valve, preferably a three-way valve, as will be understood, for the purpose of admitting the pressure to the cylinder and when desired shutting off the air and opening a suitable exhaust. The article being finished, the upper portion 25 of the mold being removed, air is admitted to the cylinder 29, causing the piston 30 to rise, and thereby forcing the bottom 27 upward, carrying with it the article out of the mold. The carrying-in boy then takes the article away to the leer. The piston 30 is then permitted to descend, which brings the mold-bottom back to its place on the table and ready for the manufacture of another article.

If desired, the upper end of the spindle 6 may be closed by a suitable cap or otherwise and air for blowing the article be admitted to the interior of the spindle from the cylinder 4 by means of a suitable hole or opening 35, formed in the side of the spindle above the piston 5 at such point that when the piston descends in the cylinder 4 the opening 35 will pass through the stuffing-box of the cylinder, and thereby establish communication between the upper part of the cylinder and the interior of the spindle. The air then passes from the cylinder into the glass-mold and expands the article therein in the manner hereinbefore described. The end of the spindle should be adapted to close the mouth of the mold, whatever its shape, and if no other provision for clamping its sections together is made to clamp it also.

If desired, the piston 5 may be operated by steam.

What I claim as my invention is—

1. In a machine for blowing pressed glass-blanks, the combination of a hollow blowing-spindle, a pneumatic cylinder and piston for operating the spindle, and a valve for controlling the admission of air to the mold, substantially as and for the purposes described.

2. In a machine for blowing pressed glass-blanks, the combination of a hollow blowing-spindle, a pneumatic cylinder and piston for operating the spindle, a divided mold, a plate or cover for closing the mouth of and clamping the mold, and a valve controlling the admission of air to the mold, substantially as and for the purposes described.

3. In a machine for blowing glassware, the combination of a hollow blowing-cylinder, a pneumatic cylinder and piston for operating the spindle, a valve which is opened and closed by the vertical movement of the spindle to govern the passage of air through the spindle, and valves for governing the admission of air to the pneumatic cylinder, substantially as and for the purposes described.

4. In a machine for blowing pressed glass-blanks, the combination of a hollow spindle, a pneumatic cylinder and piston for operating the spindle, a valve at the lower end of the spindle which is opened and closed by the vertical movement of the spindle, a pipe connecting the hollow spindle with a compressed-air reservoir or pump, and a valve-controlling mechanism for governing the admission of air to the pneumatic cylinder, substantially as and for the purposes described.

5. The combination of a sectional glass-mold with a hollow reciprocating blowing and clamping spindle, and a pneumatic cylinder and piston for operating the spindle, the superficial area of which piston is greater than that of the reacting surfaces of the mold, substantially as and for the purposes described.

6. The combination of the spindle 6, having grooved recessed end 19, with the valve 18, the plate 22, having a tubular projection 21, suspension devices 20, and perforations 23, substantially as and for the purposes described.

7. In a machine for forming glassware, the combination of a glass-mold having a vertically-movable bottom piece, a pneumatic cylinder arranged below the bed, a piston in said cylinder, and a piston-rod working through the bed to raise the bottom piece and discharge the article from the mold, substantially as described.

In testimony whereof I have hereunto set my hand this 8th day of January, 1891.

DANIEL C. RIPLEY.

Witnesses:
L. B. D. REESE,
THOMAS B. KERR.

It is hereby certified that in Letters Patent No. 458,190, granted August 25, 1891, upon the application of Daniel C. Ripley, of Pittsburg, Pennsylvania, for an improvement in "Machines for Blowing Glassware," an error appears in the printed specification requiring correction, as follows: In line 64, page 2, the word "pin" should read *fin;* and that the said Letters Patent should be read with this correction therein to make the same conform to the record of the case in the Patent Office.

Signed, countersigned, and sealed this 8th day of September, A. D. 1891.

[SEAL.]
CYRUS BUSSEY,
*Assistant Secretary of the Interior.*

Countersigned:
W. E. SIMONDS,
*Commissioner of Patents.*